No. 641,106. Patented Jan. 9, 1900.
F. E. HAWKSWORTH.
DEVICE FOR CONNECTING SHAFTS WITH OTHER PARTS.
(Application filed Sept. 5, 1899.)
(No Model.)

WITNESSES:
INVENTOR
F. E. Hawksworth
BY
ATTORNEYS

UNITED STATES PATENT OFFICE.

FRANK E. HAWKSWORTH, OF HELENA, MONTANA.

DEVICE FOR CONNECTING SHAFTS WITH OTHER PARTS.

SPECIFICATION forming part of Letters Patent No. 641,106, dated January 9, 1900.

Application filed September 5, 1899. Serial No. 729,523. (No model.)

*To all whom it may concern:*

Be it known that I, FRANK E. HAWKSWORTH, of Helena, in the county of Lewis and Clarke and State of Montana, have invented a new and Improved Device for Connecting Shafts with other Parts, of which the following is a full, clear, and exact description.

The object of the invention is to provide a device especially adapted for attaching a cam or pulley to a shaft and so constructed that when the cam or pulley is driven in a proper direction it will remain fast on the shaft, but when driven in a reverse direction may be quickly loosened from the shaft.

A further object of the invention is to provide a fastening device in substitution of the pins which are commonly employed for the same purpose, but which are liable to become loosened and fall out of place, besides being liable to be sheared off, and thus render the fastening insecure.

A further object of the invention is to provide a fastening device which offers great resistance to shearing strain, which is simple, durable, and readily applied, and which will not appreciably weaken the shaft to which it is applied.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
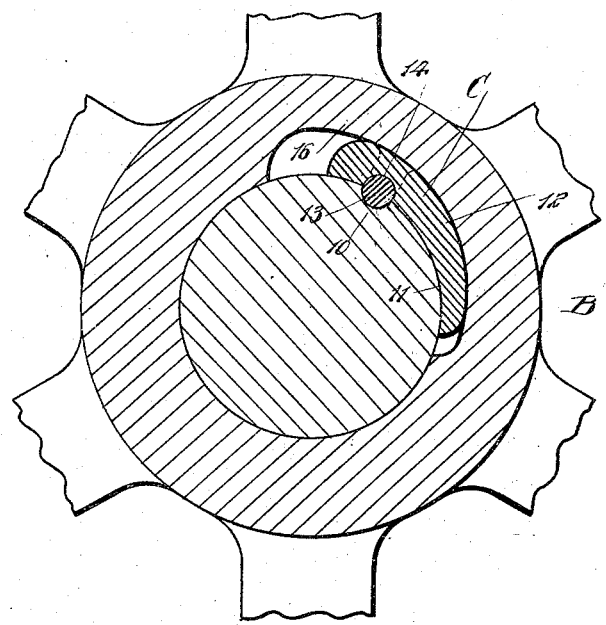
Figure 2:
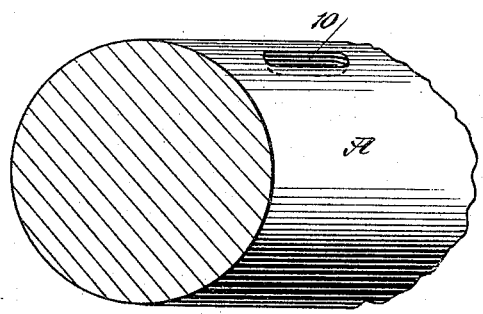
Figure 3:
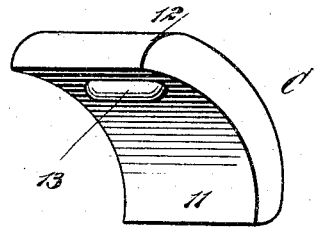
Figure 4:
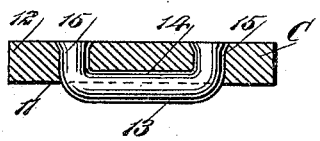

Figure 1 is a transverse section through a shaft, the hub of a pulley applied to the shaft, and the locking device whereby the pulley is secured to the shaft. Fig. 2 is a perspective view of that portion of the shaft adapted to receive the pulley. Fig. 3 is a detail perspective view of the key or wedge, and Fig. 4 is a transverse section through the said key or wedge.

The shaft A is provided with a longitudinal groove 10 in that portion adapted to receive the hub of the pulley B or other article that is to be secured on the shaft. A wedge or key C is used in connection with the shaft and the article to be attached thereto, and the inner or front face 11 of the key or wedge C is so curved as to conform neatly to the exterior of the shaft A, as shown in Fig. 1, while the outer or back face 12 is eccentric to the inner or front face 11, as is shown in both Figs. 1 and 3. The key or wedge C is provided with a transverse rib 13, located upon its inner face 11 near the thicker end of the wedge, as shown in Figs. 1, 3, and 4. This rib is preferably made of wire, is circular in cross-section, and is of a length equal to the length of the groove 10 in the shaft A, into which groove the rib is adapted to fit. When the key is placed on the shaft, one-half of the diameter of the rib enters the said slot 10 in the shaft, while the other half of the diameter of the rib is contained within a groove 14, made in the inner face of the said key or wedge, as shown in Fig. 4. The rib 13 is provided with outwardly-extending ends 15, which ends are carried through to the outer or back face of the key or wedge and are riveted at the said outer face of the wedge, as is clearly shown in Fig. 4, thus keeping the rib permanently in its place in the key or wedge.

The hub of the pulley B is provided with a seat or socket 16 of the same cross-sectional shape as the key or wedge C; but the socket or seat 16 is of greater length than the width of the said key or wedge, as is illustrated in Fig. 1. The round rib 13 entering a semicircular recess in the shaft does not weaken the shaft to the same extent as when the shaft is provided with a groove, polygonal or square in cross-section, for the reception of a similarly-shaped projection from the key or wedge, while the resistance to shearing strain is just as great.

The device is very simple, and the rib 13 cannot be lost, since it is firmly attached to the key or wedge, and the attachment of the rib is such as to materially strengthen the said wedge.

Having thus described my invention, I claim as new and desire to secure by Letters Patent—

1. The combination, with a shaft having a longitudinal semicircular groove in its outer surface, of a wedge having its inner face conforming to the exterior of the shaft and whose outer face is eccentric to its inner face, the said wedge having openings extending through it and a semicircular groove on its inner face, connecting the said openings, a rib circular in cross-section, having a portion of its body fitted in the groove of the wedge or key, the other portion of its body being adapted to enter the groove in the shaft, the ends of the said rib being carried through the openings of the wedge or key and riveted at the back thereof, and a part or member encircling the shaft and the wedge or key, the said part or member being provided with an interior seat or socket of greater length than the width of the wedge or key, but conforming to the shape of the said wedge or key, as described.

2. As a new article of manufacture, a key or wedge for connecting pulleys and the like to shafts, consisting of a curved and tapering wedge having two openings and a transversely-extending semicircular groove on its inner surface, connecting the said openings, and provided with a U-shaped rib, circular in cross-section, the body of the rib lying partially in the said groove and its ends extending through the openings and riveted at the outer surface of the wedge or key, as set forth.

FRANK E. HAWKSWORTH.

Witnesses:
LUCIAN W. HEATH,
GEO. H. PIOTT.